July 6, 1948.   E. R. BLOUT ET AL   2,444,492

INFRARED RADIATION FILTER

Filed May 2, 1945

Patented July 6, 1948

2,444,492

UNITED STATES PATENT OFFICE 2,444,492

INFRARED RADIATION FILTER

Elkan R. Blout, Cambridge, and William F. Amon, Jr., Boston, Mass., assignors to Polaroid Corporation, Cambridge, Mass., a corporation of Delaware Application May 2, 1945, Serial No. 591,574

12 Claims. (Cl. 88—109)

This invention relates to light filters, and more particularly to the production of new and improved selectively light-absorbing material for transmitting infrared radiation while substantially absorbing visible light.

A particular object of the invention is to provide such light-filtering material in sheet plastic form which will be as stable as possible under service conditions requiring exposure to relatively intense heat.

Another object is to provide such material in the form of sheets or films of a synthetic linear polyamide of the nylon type dyed with a plurality of vat dyes so chosen with respect to their absorption characteristics that in combination they substantially totally absorb visible light but are highly transparent to infrared radiation.

Further objects are to provide light-filtering material of the above characteristics wherein said plastic sheet comprises a synthetic linear polyamide which is swelled by water and particularly by alkaline solutions, to provide such material wherein said polyamide is an interpolymer of a diamine, a dibasic acid and an amino acid, and particularly an interpolymer of hexamethylenediamine adipic acid, hexamethylenediamine sebacic acid and 6-aminocaproic acid, and to provide such material wherein said vat dyes are a minus red dye and a minus blue dye.

Additional objects and advantages will in part appear and in part be pointed out in the course of the following detailed description of several embodiments of the invention, which are given as nonlimiting examples, in connection with the accompanying drawings in which.

Figure 1:
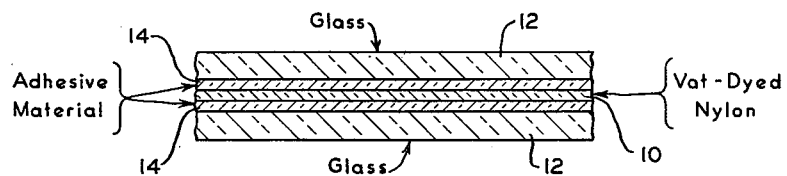
Figure 1 is a sectional view illustrating diagrammatically an embodiment of the invention.

In accordance with the present invention it has been discovered that light-filtering material of the desired optical properties and also of a high degree of stability under relatively severe service conditions may be produced from sheets or films of certain of the nylon synthetic linear polyamides. Fig. 1 illustrates an embodiment of the invention comprising a sheet 10 of polyamide material dyed in accordance with the invention and bonded between protective layers 12 of glass or the like by means of adhesive layers 14. Important requirements for the plastics used in the practice of the invention are that they should be highly stable to heat, should be readily swelled by water, particularly by an alkaline solution such as is commonly used in vat dyeing, and should have sufficient affinity for vat dyes of the desired light-absorbing characteristics. Preferred materials for the purposes of the invention are interpolyamides formed by interpolymerizing a diamine, a dibasic acid and an amino acid, and a particularly satisfactory example of this class of polyamides is the nylon sold under the designation "nylon 6A" and comprising an interpolymer of hexamethylenediamine adipic acid, hexamethylenediamine sebacic acid and 6-aminocaproic acid. Detailed descriptions of the preparation of a variety of polyamides of this class will be found in United States Patent No. 2,285,009 issued June 2, 1942, to Brubaker et al.

A variety of different dyes have been found suitable for the purpose of the invention, and choice among them may be determined partly by convenience and partly in accordance with the particular spectral characteristics desired in the finished filter material. It is convenient in selecting dyes for use in the practice of the invention to select first one which will, in the proper concentration, substantially totally absorb visible red light but will transmit as high a proportion as possible of infrared radiation, particularly near infrared radiation. It is then relatively simple to select one or more additional dyes which will absorb all of the shorter wavelengths of visible light which may be transmitted by the first said dye. Several examples of suitable combinations will accordingly be given with the understanding that they are merely illustrative embodiments of the invention and not otherwise limiting thereto. Among the minus red dyes which have been found satisfactory for the practice of the invention, two preferred examples are Carbanthrene Blue GCD (C. I. 1113) and Ponsol Jade Green (C. I. 1101). In relatively high concentrations both of these dyes appear substantially black to the eye, but when used in conjunction with a source of intense light, some transmission of blue or green light will be noted. This residual light may readily be absorbed by combining with either of said dyes a suitable red dye such, for example, as Ponsol Red G2B, believed to have the following structure:

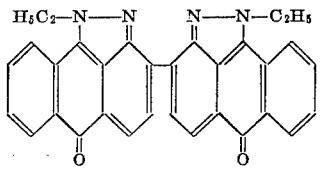

In the preceding paragraph, C. I. 1113 and C. I. 1101 refer to the color index numbers of these dyes which are listed as of American manufacture in the "1943 Year Book of the American Association of Textile Chemists and Colorists— volume XX." The characteristics of these dyes are given in the "Colour Index" of the Society of Dyers and Colourists (British) edited by F. M. Rowe, first edition, 1924. In the Colour Index the chemical composition of C. I. 1113 is given as 3:3-dichloro - N - dihydro-1:2:1(:2'-anthraquinoneazine, and the probable composition of C. I. 1101, which is made by the action of dimethyl sulphate on the oxidation product of dibenzanthrone, is stated to be dimethoxy-dibenzanthrone.

Figure 2:
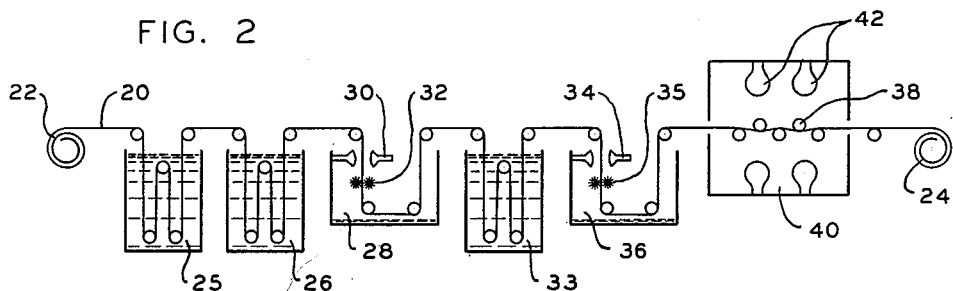
Figure 2 is a diagrammatic view illustrating a process and apparatus for producing the sheet plastic light-filtering material of the invention.

The application of the dyes to the plastic sheet may be accomplished in a variety of ways, but it is desirable to employ a continuous dyeing process as illustrated in Fig. 2, wherein sheet or film 20 of the desired polyamide material is shown as passing from a supply roll 22 through a series of tanks and other heating chambers to a take-up roll 24. As a specific example, sheet 20 may comprise nylon 6A having a thickness of 0.002 inch, and tank 25 may contain a dye solution made up approximately as follows:

| | |
|---|---|
| Ponsol Red G2B (double paste) pounds | 13½ |
| Sodium hydroxide do | 5⅜ |
| Sodium hydrosulfite do | 4⅛ |
| Water liters | 150 |

In this specific example tank 26 may contain a solution made up approximately as follows:

| | |
|---|---|
| Ponsol Jade Green (double paste) pounds | 7⅜ |
| Sodium hydroxide do | 3 |
| Sodium hydrosulfite do | 2½ |
| Water liters | 150 |

The temperature of these two solutions should preferably be maintained near 80° C. but should not rise substantially above 90° C., since at higher temperatures the sheet may tend to dissolve. On the other hand, lower temperatures may be used but longer periods of treatment will be needed for comparable results. The length of time any given portion of sheet 20 remains in each tank may readily be controlled by both the speed of the sheet through each tank and the number of guide rolls around which the sheet is looped in each tank. Generally speaking, this time may run from one to nine minutes for each tank, depending upon the temperature of the solution and the degree of density desired in the finished sheet. It is immaterial whether sheet 20 be treated first with the blue or the red dye solution, and thereafter it is preferably washed as by passing through tank 28 between water sprays 30 and rotating brushes 32.

Since both of the dyes in tanks 25 and 26 are in their leuco form, it is necessary that they be oxidized to their proper final color, and tank 33 accordingly contains a suitable oxidizing solution which may, for example, be made up as follows:

| | |
|---|---|
| Sodium perborate pounds | 4 |
| Acetic acid liters | 1½ |
| Water do | 150 |

The temperature of this solution is preferably of the order of 60° C., and time of treatment therein for sheet 20 will range from one to nine minutes. The sheet should then again be washed, as by means of water sprays 34 and rotating brushes 35 in tank 36. Thereafter sheet 20 should be dried in any suitable way, as by passing over metal rolls 38 in chamber 40 provided with any suitable source of heat such, for example, as a plurality of infrared lamps 42.

It will be understood that in a continuous process of dyeing such as that just described, the strength of the dye solutions is gradually decreased, and it is accordingly desirable that they be replenished periodically. In general a schedule for replenishing and the amounts of the materials to be added are best determined by means of trial runs and frequent inspection of the finished sheet to maintain its optical characteristics substantially constant. The rate of travel of sheet 20 through the tanks is also a controlling factor. In any case the oxidizing solution in tank 33 should be replenished at substantially half-hour intervals by the addition of the same amount of its constituent chemicals as in the original solution.

Figure 3:
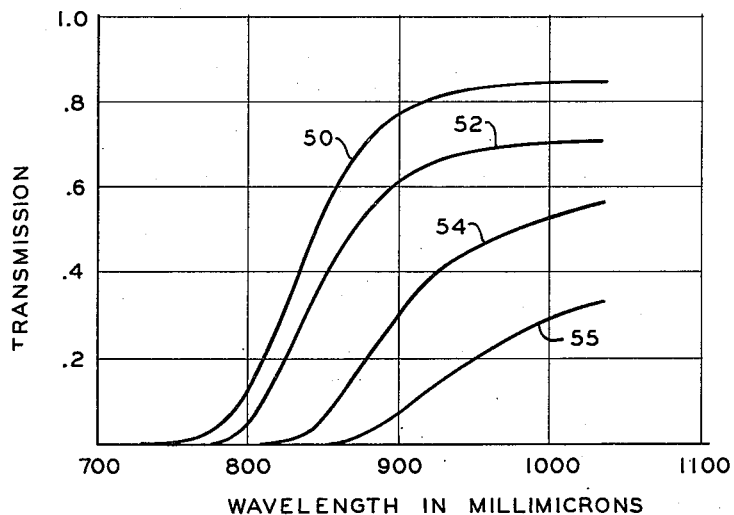
Figure 3 is a graph illustrating the light-transmitting properties of several embodiments of the invention.

Curve 50 in Fig. 3 illustrates the light-transmitting properties of a sheet of nylon 6A dyed as described above and travelling at a rate such that any given portion is in contact with each dye solution a period of approximately two minutes. It will be noted from curve 50 that such a sheet will transmit substantially no light of wavelengths shorter than approximately 750 m $\mu$, but that its transmission rises relatively rapidly to near 80% at 900 m $\mu$ and averages 85% for longer wavelengths. Curve 52 in Fig. 3 illustrates the transmission characteristics of another nylon sheet dyed as described above but travelling at a slower rate such that each portion thereof is in contact with each dye solution for approximately three minutes. It will be noted that curves 50 and 52 are substantially paralled but that curve 52 shows substantially no transmission below 775 m $\mu$ and an average of 70% or less for wavelengths of 900 m $\mu$ and longer. These two curves are given as illustrative of the variations in transmission characteristics obtainable by variation in the time of the dyeing steps of the above process, and it will be understood that further variations in dyeing times or the concentrations of the dye solutions will produce corresponding variations in the transmission characteristics of the resulting filters.

Curves 54 and 55 in Fig. 3 represent the light-transmitting characteristics of two substantially more dense nylon sheets dyed in accordance with the process of the invention but utilizing as the minus red dye Carbanthrene Blue GCD. In preparing the filters whose characteristics are represented by curves 54 and 55, a sheet of nylon 6A may be passed first through two tanks each containing a solution of Ponsol Red G2B made up as described above in connection with tank 25 and then through two tanks each containing a solution made up approximately as follows:

Carbanthrene Blue GCD
  (quadruple powder) _____pounds__ 20
Sodium hydroxide _____do____ 8
Sodium hydrosulfite _____do____ 7
Water _____liters__ 150

Thereafter each sheet may be washed, oxidized and dried as described above in connection with Fig. 2.

Curve 54 in Fig. 3 represents the light-transmitting characteristics of the sheet dyed as described in the preceding paragraph and wherein the time of treatment in each of the two tanks of each dye was approximately four minutes, and curve 55 represents the light-transmitting properties of a similar sheet wherewith the dyeing times were increased to approximately seven to eight minutes. It will be noted that curve 54 shows no detectable transmission below 800 m$\mu$ and rises relatively slowly to 30% at 900 m$\mu$ and better than 50% at 1000 m$\mu$. Curve 55 shows a still higher cut off, with substantially no transmission below 850 m$\mu$ and rises more slowly to a value of near 30% at 1000 m$\mu$.

It is desirable to provide the dyed filter material of the invention with protective cover means, as by laminating to or between glass plates as shown in Fig. 1. Selection of a proper material for use in adhesive layers 14 involves a number of important factors. For preferred results the adhesive should swell nylon sheet 10 or should harden without giving off aqueous or organic vapors to which the sheet is impervious and which would therefore cause bubbles in the lamination. It is also important that the adhesive should not soften unduly or have any appreciable tendency to decompose or be otherwise affected by the heat or other conditions of use. Preferred results from all of these standpoints have been obtained with the product sold during the month of October 1944, by Chrysler Corporation under the trade name "Cycle-Weld 55-6." In general, satisfactory results may be obtained by laminating dyed nylon material of the invention to a single plate of glass preferably a heat resistant glass such as "Pyrex," although two-sided laminations may also be used.

"Cycle-Weld" adhesives, which are described in Saunders and Morrison Patent 2,376,854 issued May 22, 1945, comprise a thermo-setting synthetic resin and a synthetic rubber selected from the group consisting of chloroprene polymers and butadiene acrylic nitrile copolymers.

In one method of laminating according to the invention, a solution comprising Cycle-Weld 55-6 and two parts butanol by volume may be sprayed or otherwise applied to one surface of a sheet of said nylon and to a suitable glass plate, after which the solvent is removed from said coating, preferably by air drying for a short time followed by a heating as in an oven to a temperature of the order of 100° C. for approximately 10 minutes. The sheet and plate are then placed with their coated surfaces in face-to-face relation and subjected to heat and pressure. A temperature of the order of 150° C. and a pressure of 60 to 70 pounds per square inch have been found suitable, and the lamination is permitted to remain under heat and pressure for approximately fifteen minutes. During this treatment the heat softens the two adhesive layers and causes them to fuse, after which they condense to a rock-like consistency. The simultaneous application of pressure serves to prevent the formation of bubbles within the lamination. Subsequent reheating will not appreciably soften the bond until the temperature exceeds the decomposition point of the adhesive, which is approximately 185° C.

In another laminating process according to the invention, the glass surface to be bonded to the dyed nylon is first covered with a solution comprising equal parts of Cycle-Weld 55-6 and butanol. The plastic film is then superimposed on the coated surface and excess adhesive squeezed out from the lamination, as by means of a squeegee or similar implement. Thereafter the lamination can be completed by heating at a temperature of the order of 150° C. for from one-half to one hour. This heating step may be carried out in an oven, but the use of an autoclave is preferred for the reason that bubble formation is minimized by the pressure. It should be expressly understood that the invention is not limited to the use of Cycle-Weld or the above specifically described laminating techniques. Any other adhesive satisfying the above-discussed requirements may be used. It should also be noted that if the laminated filter is not exposed to high heat the choice of adhesives is substantially wider, for example, laminations made between glass plates by means of an incomplete polyvinyl acetal, such for example as plasticized polyvinyl butyral. When the filter sheet is bonded to a single glass or other supporting layer, it is desirable to protect its other surface with a suitable lacquer or similar material which will transmit infrared radiation. An example of a suitable lacquer is the melamine formaldehyde compound sold under the trade name "Polymerin," a product of Ault and Wiborg Corporation, and all such modifications are to be understood as coming within the scope of the invention.

Filters produced as described above have been found to possess excellent properties for optical purposes and to be characterized by a high degree of stability and resistance to relatively severe operating conditions. They are substantially unaffected by heating to temperatures as high as 200° C., and this is true also with respect to intermittent heating and cooling. They show no appreciable deterioration as a result of exposure to ultraviolet radiation or to humidity as high as 100%. They are relatively easy to produce by a continuous dyeing process as described above and with a high degree of physical and optical uniformity. Another property useful in optical work is that the radiation transmitted is transmitted substantially without diffusion, and additional advantages will be noted and appreciated in the course of practicing the invention.

Since certain changes in carrying out the above process, and certain modifications in the product which embody the invention may be made without departing from its scope, it is intended that all matter contained in the above description, or shown in the accompanying drawings shall be interpreted as illustrative and not in a limiting sense.

What is claimed is:

1. A light filter comprising a sheet of organic plastic material, said plastic comprising a linear, synthetic polyamide which is swelled by alkaline solutions, said sheet having incorporated therewith a vat dye substantially totally absorbing visible red light but substantially transmitting infrared radiation and at least one other vat dye absorbing visible light in a region of the spectrum different from the region wherein said first-named dye absorbs, the absorption characteristics of said dyes being such that in combination they substantially uniformly absorb all visible light but substantially transmit infrared radiation.

2. A light filter comprising a sheet of organic plastic material, said plastic comprising an interpolyamide of a diamine, a dibasic acid and an amino acid, said sheet having incorporated therewith a vat dye substantially totally absorbing visible red light but substantially transmitting infrared radiation and at least one other vat dye absorbing visible light in a region of the spectrum different from the region wherein said first-named dye absorbs, the absorption characteristics of said dyes being such that in combination they substantially uniformly absorb all visible light but substantially transmit infrared radiation.

3. A light filter comprising a sheet of organic plastic material, said plastic comprising an interpolyamide of hexamethylenediamine adipic acid, hexamethylenediamine sebacic acid and 6-aminocaproic acid, said sheet having incorporated therewith a vat dye substantially totally absorbing visible red light but substantially transmitting infrared radiation and at least one other vat dye absorbing visible light in a region of the spectrum different from the region wherein said first-named dye absorbs, the absorption characteristics of said dyes being such that in combination they substantially uniformly absorb all visible light but substantially transmit infrared radiation.

4. A light filter comprising a sheet of organic plastic material, said plastic comprising an interpolyamide of hexamethylenediamine adipic acid, hexamethylenediamine sebacic acid and 6-aminocaproic acid, said sheet having incorporated therewith a vat dye substantially totally absorbing visible red light but substantially transmitting infrared radiation and at least one other vat dye absorbing visible light in a region of the spectrum different from the region wherein said first-named dye absorbs, the absorption characteristics of said dyes being such that in combination they substantially uniformly absorb all visible light but substantially transmit infrared radiation, said dyes being Ponsol Red G2B and 3:3-dichloro - N-dihydro-1:2:1':2'-anthraquinoneazine.

5. A light filter comprising a sheet of organic plastic material, said plastic comprising an interpolyamide of hexamethylenediamine adipic acid, hexamethylenediamine sebacic acid and 6-aminocaproic acid, said sheet having incorporated therewith a vat dye substantially totally absorbing visible red light but substantially transmitting infrared radiation and at least one other vat dye absorbing visible light in a region of the spectrum different from the region wherein said first-named dye absorbs, the absorption characteristics of said dyes being such that in combination they substantially uniformly absorb all visible light but substantially transmit infrared radiation, said dyes being Ponsol Red G2B and dimethoxy-dibenzanthrone.

6. A light filter comprising a sheet of organic plastic material, said plastic comprising an interpolyamide of hexamethylenediamine adipic acid, hexamethylenediamine sebacic acid and 6-aminocaproic acid, said sheet having incorporated therewith a vat dye substantially totally absorbing visible red light but substantially transmitting infrared radiation and at least one other vat dye absorbing visible light in a region of the spectrum different from the region wherein said first named dye absorbs, the absorption characteristics of said dyes being such that in combination they substantially uniformly absorb all visible light but substantially transmit infrared radiation, said sheet being bonded to a layer of glass by an adhesive layer comprising a thermo-setting synthetic resin and a synthetic rubber selected from the group consisting of chloroprene polymers and butadiene acrylic nitrile copolymers.

7. A laminated light filter comprising, in combination, a sheet of linear, synthetic polyamide which is swelled by alkaline solutions, said sheet having incorporated therewith a vat dye substantially totally absorbing visible red light but substantially transmitting infrared radiation and at least one other vat dye absorbing visible light in a region of the spectrum different from the region wherein said first-named dye absorbs, the absorption characteristics of said dyes being such that in combination they substantially uniformly absorb all visible light but substantially transmit infrared radiation, a supporting layer for said polyamide sheet, and an adhesive securing said polyamide sheet and supporting layer together and comprising a thermo-setting synthetic resin and a synthetic rubber selected from the group consisting of chloroprene polymers and butadiene acrylic nitrile copolymers.

8. A laminated light filter comprising, in combination, a sheet of linear, synthetic polyamide which is swelled by alkaline solutions, said sheet having incorporated therewith a vat dye substantially totally absorbing visible red light but substantially transmitting infrared radiation and at least one other vat dye absorbing visible light in a region of the spectrum different from the region wherein said first-named dye absorbs, the absorption characteristics of said dyes being such that in combination they substantially uniformly absorb all visible light but substantially transmit infrared radiation, a layer of glass, and an adhesive securing said polyamide sheet and layer of glass together and comprising a thermo-setting synthetic resin and a synthetic rubber selected from the group consisting of chloroprene polymers and butadiene acrylic nitrile copolymers.

9. A laminated light filter comprising, in combination, a sheet of linear, synthetic polyamide which is swelled by alkaline solutions, said sheet having incorporated therewith a vat dye substantially totally absorbing visible red light but substantially transmitting infrared radiation and at least one other vat dye absorbing visible light in a region of the spectrum different from the region wherein said first-named dye absorbs, the absorption characteristics of said dyes being such that in combination they substantially uniformly absorb all visible light but substantially transmit infrared radiation, a layer of glass, an adhesive securing said polyamide sheet and layer of glass together and comprising a thermo-setting synthetic resin and a synthetic rubber selected from the group consisting of chloroprene polymers and butadiene acrylic nitrile copolymers, and a coating, comprising plastic material transmitting infrared radiation, on the surface of the polyamide sheet opposite to the glass.

10. A laminated light filter comprising, in combination, a sheet of linear, synthetic polyamide which is swelled by alkaline solutions, said sheet having incorporated therewith a vat dye substantially totally absorbing visible red light but substantially transmitting infrared radiation and at least one other vat dye absorbing visible light in a region of the spectrum different from the region wherein said first-named dye absorbs, the absorption characteristics of said dyes being such that in combination they substantially uniformly absorb all visible light but substantially transmit infrared radiation, layers of glass, one on each side of said polyamide sheet, and adhesive securing said polyamide sheet and glass layers together and comprising a thermo-setting synthetic resin and a synthetic rubber selected from the group consisting of chloroprene polymers and butadiene acrylic nitrile copolymers.

11. A light filter comprising a sheet of linear, synthetic polyamide which is swelled by alkaline solutions, said sheet having incorporated therewith a vat dye of the group consisting of 3:3-dichloro-N-dihydro - 1:2:1':2' - anthraquinoneazine and dimethoxy-dibenzanthrone, and at least one other vat dye absorbing visible light in a region of the spectrum different from the region wherein said first-named dye absorbs, the absorption characteristics of said dyes being such that in combination they substantially uniformly absorb all visible light but substantially transmit infrared radiation.

12. A light filter comprising a sheet of linear, synthetic polyamide which is swelled by alkaline solutions, said sheet having incorporated therewith a vat dye of the group consisting of 3:3-dichloro - N-dihydro-1:2:1':2'-anthraquinoneazine and dimethoxy-dibenzanthrone, and Ponsol Red G2B, the absorption characteristics of said dyes being such that in combination they substantially uniformly absorb all visible light but substantially transmit infrared radiation.

ELKAN R. BLOUT.
WILLIAM F. AMON, Jr.

REFERENCES CITED

The following references are of record in the file of this patent:

UNITED STATES PATENTS

| Number | Name | Date |
|---|---|---|
| 1,959,980 | Henderson et al. | May 22, 1934 |
| 2,062,179 | Hunter | Nov. 24, 1936 |
| 2,216,735 | Carothers | Oct. 8, 1940 |
| 2,265,559 | Watkins | Dec. 9, 1941 |
| 2,365,416 | Kuhne | Dec. 19, 1944 |

FOREIGN PATENTS

| Number | Country | Date |
|---|---|---|
| 320,044 | Great Britain | Oct. 2, 1929 |

OTHER REFERENCES

"Wratten Light Filters" publ. by Eastman Kodak Co., Rochester, New York, 1929; pages 19, 56, 57, 61, 62, 77 to 80 and 83.